(12) United States Patent
Suematsu et al.

(10) Patent No.: US 8,637,201 B2
(45) Date of Patent: Jan. 28, 2014

(54) COOLING SYSTEM

(75) Inventors: Keigo Suematsu, Toyota (JP); Yuichi Sakajo, Toyohashi (JP); Masanori Uehara, Kariya (JP); Takashi Koyama, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 363 days.

(21) Appl. No.: 12/986,824

(22) Filed: Jan. 7, 2011

(65) Prior Publication Data

US 2011/0177416 A1  Jul. 21, 2011

(30) Foreign Application Priority Data

Jan. 20, 2010  (JP) ................................. 2010-009718

(51) Int. Cl.
*H01M 8/04* (2006.01)
(52) U.S. Cl.
USPC ............................ 429/436; 429/437; 429/440
(58) Field of Classification Search
None
See application file for complete search history.

(56) References Cited

U.S. PATENT DOCUMENTS 6,383,672 B1  5/2002  Fujita
2009/0130513 A1*  5/2009  Tsuchiya et al. ................ 429/26

FOREIGN PATENT DOCUMENTS

| JP | 2000-315512 A | 11/2000 |
|----|---|---|
| JP | 2001315524 A | 11/2001 |
| JP | 2004146240 A | 5/2004 |
| JP | 2005263200 A | 9/2005 |
| JP | 2007038950 A | 2/2007 |
| JP | 2007-157616 A | 6/2007 |
| JP | 2010-282808 | * 12/2010 |

* cited by examiner

*Primary Examiner* — Jonathan Crepeau
(74) *Attorney, Agent, or Firm* — Gifford, Krass, Sprinkle, Anderson & Citkowski, P.C.

(57) ABSTRACT

A cooling system is provided. The cooling system includes: a fuel cell; a cooling circuit configured to circulate a coolant medium to cool the fuel cell; an air conditioning circuit configured to circulate the coolant medium, the air conditioning circuit having a heat exchanger to execute heat exchange between the coolant medium and air to be sent to a room; a switching unit configured to switch between a connected state and a disconnected state; and a controller configured to control operation of the cooling system, wherein when the controller switches a state of the cooling system from the disconnected state to the connected state, irrespective of conditions in the cooling system, the controller executes operation of the cooling system in a flow rate control mode whereby the ratio (L1/L2) of a first flow rate (L1) to a second flow rate (L2) is set to or above a prescribed value, wherein the first flow rate (L1) represents the flow rate of the coolant medium flowing through the cooling circuit, and the second flow rate (L2) represents the flow rate of the coolant medium flowing through the air conditioning circuit.

8 Claims, 9 Drawing Sheets

FIRST CONNECTION STATE

SECOND CONNECTION STATE

COOLING SYSTEM

CROSS-REFERENCE TO RELATED APPLICATIONS

The present application claims priority of Japanese Patent Application No. 2010-9718, filed on Jan. 20, 2010, the disclosure of which is incorporated by reference in its entirety.

BACKGROUND OF THE INVENTION

1. Field of the Invention

The present invention relates to a cooling system.

2. Description of the Related Art

In the field of fuel cell-equipped vehicles, there are known techniques for utilizing waste heat from the fuel cell as a heat source for temperature control of the vehicle interior. For example, according to one known technique, coolant flowing through a coolant circulation path including a fuel cell is delivered to a heater core, and air which is temperature-controlled by the heater core is then delivered to the vehicle interior (see, for example JP2001-315524A).

However, the aspect in which waste heat from a fuel cell is utilized as a heat source for temperature control of the vehicle interior has some problems as follows. When the coolant which has undergone heat exchange in the heater core flows back into the coolant circulation path, the temperature of the coolant in the coolant circulation path may in some instances fall excessively. Also, when the overcooled coolant is supplied to the fuel cell, the temperature of the fuel cell may fall excessively and in some instances the generating efficiency of the fuel cell may be reduced by the overcooled coolant.

SUMMARY

An object of the present invention is to provided technology that is able to limit temperature decline of a coolant medium flowing through a coolant circulation path (hereinafter also termed the "cooling circuit") which includes a fuel cell, which is a problem that may be encountered when waste heat from a fuel cell is utilized as a heat source of air conditioning.

The present invention is addressed to attaining the above objects at least in part according to the following aspects of the invention.

According to a first aspect of the present invention, a cooling system is provided. The cooling system comprises:

a fuel cell;

a cooling circuit configured to circulate a coolant medium to cool the fuel cell;

an air conditioning circuit configured to circulate the coolant medium, the air conditioning circuit having a heat exchanger to execute heat exchange between the coolant medium and air to be sent to a room;

a switching unit configured to switch between a connected state and a disconnected state, wherein in the connected state the coolant medium flows from the cooling circuit to the air conditioning circuit, and then the coolant medium passed through the heat exchanger flows to the cooling circuit, and in the disconnected state a flow of a coolant medium between the cooling circuit and the air conditioning circuit is blocked; and a controller configured to control operation of the cooling system, wherein when the controller switches a state of the cooling system from the disconnected state to the connected state, irrespective of conditions in the cooling system, the controller executes operation of the cooling system in a flow rate control mode whereby the ratio (L1/L2) of a first flow rate (L1) to a second flow rate (L2) is set to or above a prescribed value, wherein the first flow rate (L1) represents the flow rate of the coolant medium flowing through the cooling circuit, and the second flow rate (L2) represents the flow rate of the coolant medium flowing through the air conditioning circuit.

According to the cooling system of the first aspect, when switching from the disconnected state to the connected state, by operating the cooling system in flow rate control mode whereby the ratio (L1/L2) is set to or above a prescribed value irrespective of the conditions in the cooling system, it is possible to prevent the temperature of the convergent coolant from dropping due to the coolant flowing through the air conditioning circuit after having passed through the heat exchanger having converged with the coolant flowing through the cooling circuit.

According to a second aspect of the present invention, a cooling system is provided. The cooling system comprises:

a fuel cell;

a cooling circuit configured to circulate a coolant medium to cool the fuel cell;

an air conditioning circuit configured to circulate the coolant medium, the air conditioning circuit having a heat exchanger to execute heat exchange between the coolant medium and air to be sent to a room;

a switching unit configured to switch between a connected state and a disconnected state, wherein in the connected state the coolant medium flows from the cooling circuit to the air conditioning circuit, and then the coolant medium having passed through the heat exchanger flows to a cooling circuit, and in the disconnected state a flow of a coolant medium between a cooling circuit and the air conditioning circuit is blocked; and a controller configured to control operation of the cooling system, wherein when the controller switches a state of the cooling system from the disconnected state to the connected state, irrespective of the heating demand by the air conditioning end, the controller executes operation of the cooling system in a heat discharge control mode whereby the upper limit value of heat discharge of the heat exchanger is set to or below a prescribed value.

According to the cooling system of the second aspect, when switching from the disconnected state to the connected state, by setting the control mode of the cooling system to operate in heat discharge control mode whereby the heat discharge of the heat exchanger is set to or below a prescribed value irrespective of the demand for heating, it is possible to prevent the temperature of the convergent coolant from dropping due to the coolant flowing through the air conditioning circuit after having passed through the heat exchanger having converged with the coolant flowing through the cooling circuit.

The present invention may be realized in various other aspects, such as a moving body or residential building equipped with any of the above cooling systems, or a control method for a cooling system. These and other objects, features, aspects, and advantages of the present invention will become more apparent from the following detailed description of the preferred embodiments with the accompanying drawings.

DESCRIPTION OF THE PREFERRED EMBODIMENT

Figure 1:
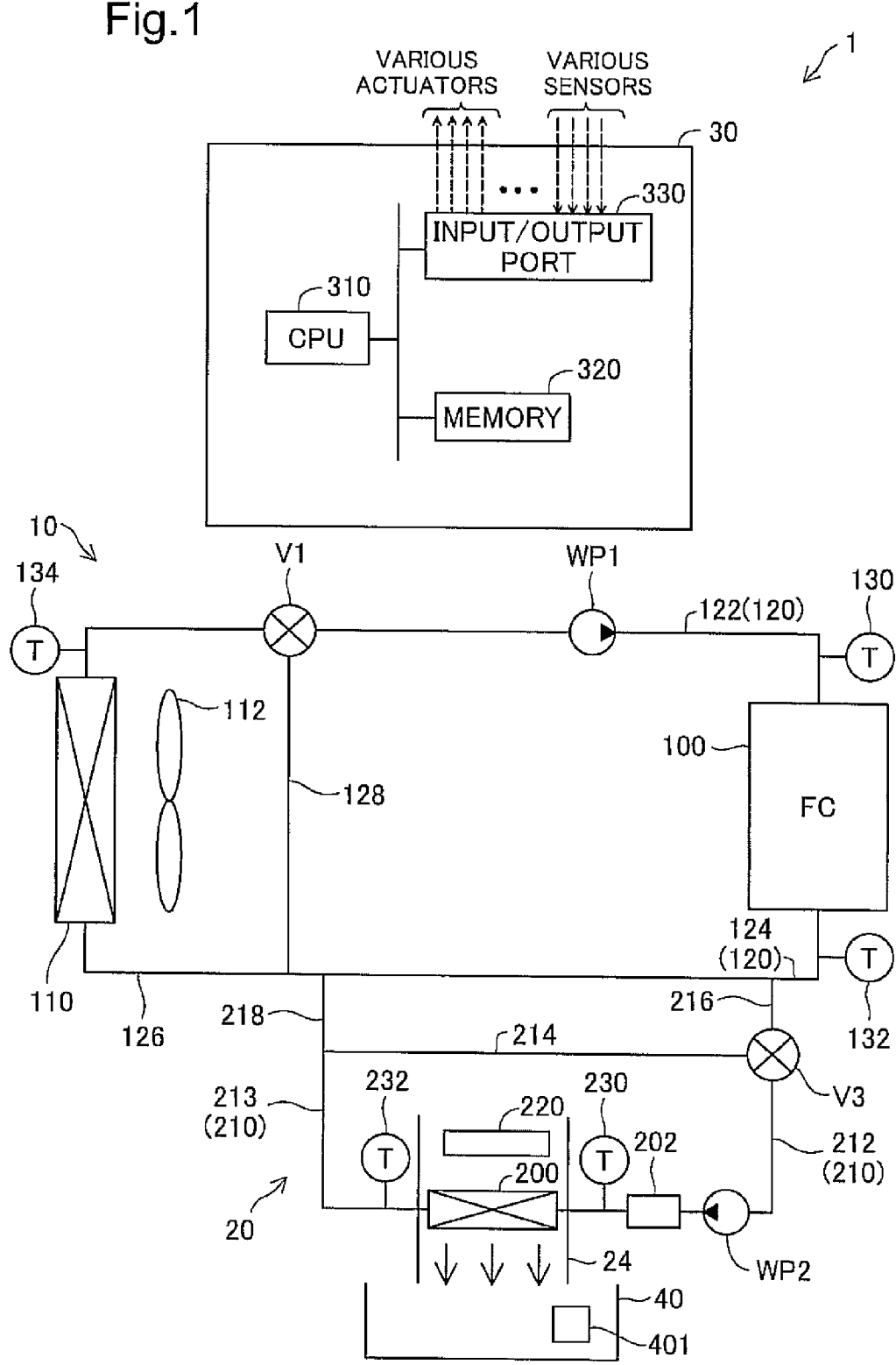
FIG. 1 shows the arrangement of cooling system 1 in a first embodiment of the present invention.
Figure 2A:
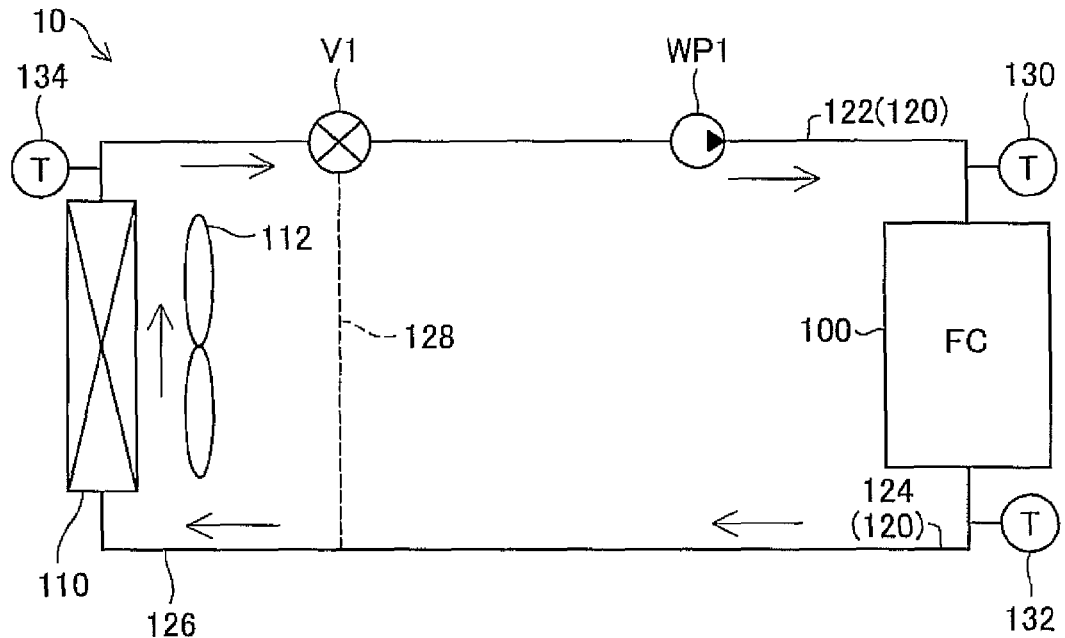
FIGS. 2A and 2B illustrate conditions in a cooling circuit 10.
Figure 2B:
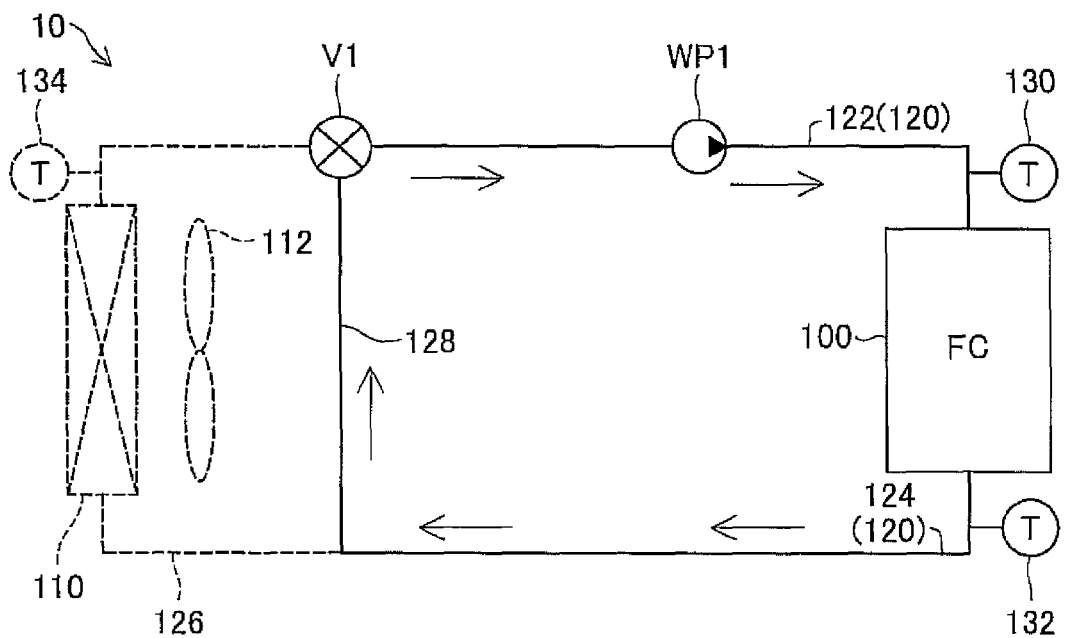

Next, aspects of the present invention will be described in the following order on the basis of embodiments:
A. First Embodiment
A-1: System Configuration FIG. 1 shows the arrangement of cooling system 1 in a first embodiment of the present invention. FIGS. 2A and 2B illustrate conditions in a cooling circuit. FIGS. 2A and 2B depict only those arrangements of the cooling system 1 which are necessary for the description of the first embodiment of the present invention. In the present embodiment, the cooling system 1 is installed in a vehicle.

As depicted in FIG. 1, the cooling system 1 of the present embodiment primarily includes a fuel cell stack 100 (also termed simply "FC 100"); a cooling circuit 10 adapted to circulate coolant water for cooling the fuel cell stack 100; an air conditioning circuit 20 adapted to circulate coolant water for use in air conditioning of the vehicle interior 40; first and second communicating flow channels 216, 218; a valve V3; and an ECU (Electronic Control Unit) 30 for controlling operation of the cooling system 1. While omitted from the drawings, the cooling system 1 also be includes hydrogen feed/discharge subsystems for feed/discharge of hydrogen fuel gas, and air feed/discharge subsystems for feed/discharge of air as the oxidant gas. The hydrogen feed/discharge subsystems are adapted to deliver hydrogen to the anodes of the fuel cell stack 100, and to discharge out from the system 1 the anode off-gas emitted from the fuel cell stack 100. The air feed/discharge subsystems are adapted to deliver air to the cathodes of the fuel cell stack 100, and to discharge out from the system 1 the cathode off-gas emitted from the fuel cell stack 100.

The fuel cell stack 100 comprises polymer electrolyte fuel cells, which are relatively compact and offer outstanding generating efficiency and which are designed to produce electromotive force through electrochemical reactions at the electrodes between a pure hydrogen fuel gas and oxygen that is contained in air provided as the oxidant gas. The fuel cell stack 100 has a stacked structure composed of a plurality of stacked unit cells (not shown) with intervening separators (not shown); the number of stacked cells can be selected appropriately according to the output required of the fuel cell stack 100.

The cooling circuit 10 includes a first cooling flow channel 120, a second cooling flow channel 126, and a third cooling flow channel 128. By controlling opening and closing of the valve V1, the cooling circuit 10 sets up a circulation flow channel defined by the first cooling flow channel 120 and the second cooling flow channel 126, or a circulation flow channel defined by the first cooling flow channel 120 and the third cooling flow channel 128.

The fuel cell stack 100 is situated in the middle of the first cooling flow channel 120. The first cooling flow channel 120 has an inlet-end flow channel 122 and an outlet-end flow channel 124. The coolant flowing in the fuel cell stack 100 flows through the inlet-end flow channel 122. The coolant outflowing from the fuel cell stack 100 flows through the outlet-end flow channel 124. That is, the cooling circuit 10 constitutes a circulation flow channel for circulating the coolant passing through the fuel cell stack 100. The inlet-end flow channel 122 has a water pump WP1 (herein also termed simply "pump WP1") for circulating coolant inside the cooling circuit 10, and a temperature sensor 130. The temperature sensor 130 is arranged in the inlet-end flow channel 122 in the section thereof lying in proximity to the coolant inlet of the fuel cell stack 100. Another temperature sensor 132 is arranged in the outlet-end flow channel 124 in the section thereof lying in proximity to the coolant outlet of the fuel cell stack 100. The temperature sensor 130 is used primarily to detect coolant temperature at the coolant inlet of the fuel cell stack 100. The temperature sensor 132 is used primarily to detect coolant temperature at the coolant outlet of the fuel cell stack 100.

The second cooling flow channel 126 connects to both ends of the first cooling flow channel 120. The second cooling flow channel 126 has a radiator 110 for cooling the coolant; and a temperature sensor 134. On the basis of detected values from the temperature sensor 134, the ECU 30 controls operation of a fan 112 in order to regulate the temperature of the coolant flowing through the second cooling flow channel 126.

The third cooling flow channel 128 is a bypass channel that allows the coolant flowing through the outlet-end flow channel 124 to inflow to the inlet-end flow channel 122 without passing through the second cooling flow channel 126.

As depicted in FIGS. 2A and 2B, through control of opening and closing of the valve V1 by the ECU 30, the cooling system 1 may be placed in either a first communication state (FIG. 2A) in which the first and second cooling flow channels 120, 126 are in communication and the first and third cooling flow channels 120, 128 are in non-communication, or a second communication state (FIG. 2B) in which the first and second cooling flow channels 120, 126 are in non-communication and the first and third cooling flow channels 120, 128 are in communication. These communication states are set up according to the temperature of the coolant being supplied to the fuel cell stack 100 for example. Specifically, when the ECU 30 has determined that coolant delivery temperature detected by the temperature sensor 130 is equal to or greater than a prescribed value, it sets up the first communication state and uses the radiator 110 and the fan 112 to cool the coolant. Or, when ECU 30 has determined that coolant delivery temperature is less than the prescribed value, it sets up the second communication state so that the coolant is circulated without being cooled. By adjusting the ratio of valve opening of the valve V1, it is possible to adjust the flow rate proportions of (a) coolant inflowing to the second cooling flow channel 126 from the outlet-end flow channel 124, and (b) coolant inflowing to the third cooling flow channel 128 from the outlet-end flow channel 124.

As shown in FIG. 1, the air conditioning circuit 20 has a first air conditioning flow channel 210, and a second air conditioning flow channel 214 that connects to both ends of the first air conditioning flow channel 210. With the first air conditioning flow channel 210 and the second air conditioning flow channel 214 it is possible to define a circulation flow channel for the coolant.

The first air conditioning flow channel 210 has an electric heater 202, a heater core 200 provided as the heat exchanger, a water pump WP2 (herein also termed simply "pump WP2"), and two temperature sensors 230, 232. The first air conditioning flow channel 210 has an inlet-end air conditioning flow channel 212 and an outlet-end air conditioning flow channel 213. The coolant flowing in the heater core 200 flows through the inlet-end air conditioning flow channel 212. The coolant outflowing from the heater core 200 flows through the outlet-end air conditioning flow channel 213.

Through the two communicating flow channels 216, 218, it is possible for the cooling system 1 to direct the flow of coolant in the cooling circuit 10 into the air conditioning circuit 20 so that the inflowing coolant flows through the air conditioning circuit 20 and thence flows back into the cooling circuit 10. Specifically, the cooling system 1 has a connected state in which the coolant flowing through the cooling circuit 10 is directed into the air conditioning circuit 20, and the inflowing coolant flows through the air conditioning circuit 20 and thence flows back into the cooling circuit 10; and a disconnected state in which flow of coolant between the cooling circuit 10 and the air conditioning circuit 20 is blocked. Switching between these two states is executed by switching opening or closing of the valve V3 which is provided at the connection point between the second communicating flow channel 216, the first air conditioning flow channel 210, and the second air conditioning flow channel 214. Here, the valve V3 corresponds to the disclosed "switching unit."

In the connected state, the coolant circulates through the cooling circuit 10 and the air conditioning circuit 20. In the disconnected state, the coolant in the cooling circuit 10 circulates through the cooling circuit 10 only, and the coolant in the air conditioning circuit 20 circulates through the air conditioning circuit 20 only. In other words, the connected state is one in which waste heat from the fuel cell stack 100 is utilizable as the heat source for temperature control of the vehicle interior; and the disconnected state is one in which waste heat from the fuel cell stack 100 is not utilizable as the heat source for temperature control of the vehicle interior.

The heater core 200 is arranged inside a ventilation duct 24, and a blower 220 provided by way of a blower machine situated at the upstream end of the ventilation duct 24 heats the air as it is being blown out. Specifically, heat exchange takes place between the coolant flowing inside the heater core 200 and the air that is blown out from the blower 220 towards the heater core 200. The heat-exchanged air is then sent from the ventilation duct 24 to the interior of the moving body, i.e. the vehicle interior 40. The ECU 30 regulates the heat discharge of the heater core 200 by controlling the speed of rotation (also called "rate of rotation" or "rate of revolution") of the pump WP2 and the speed of rotation (also called "rate of rotation") of the blower 220 according to target vehicle interior temperature set by the user, current vehicle interior temperature, current temperature outside the vehicle, and so on. That is, the ECU 30 executes operation of the cooling system 1 in response to demands for heating made from the air conditioning end.

A temperature setting control 401 situated in the vehicle interior 40 allows the user to set a desired vehicle interior temperature from the temperature setting control 401. The temperature setting control 401 has a Heat switch (not shown) for activating heat mode to heat the vehicle interior 40; when the user turns ON the Heat switch, the ECU 30 receives a switch ON signal and performs a heating operation using the air conditioning circuit 20. The vehicle interior temperature which is set by the user with the temperature setting control 401 is sent as an output signal to the ECU 30, which is utilized to control various actuators during heating operations.

When the quantity of heat of coolant having undergone heat exchange in the heater core 200 is not sufficient, the electric heater 202 is used to heat the coolant inflowing to the heater core 200. For example, with the cooling system 1 in the disconnected state, because waste heat of the fuel cell stack 100 cannot be utilized, the coolant inflowing to the heater core 200 is heated by the electric heater 202 according to the demand for heating.

The temperature sensor 230 detects the temperature of coolant inflowing to the heater core 200. The temperature sensor 232 detects the temperature of coolant that has flowed through the heater core 200. The temperatures detected by the two temperature sensors 230, 232 send as output signals to the ECU 30, which use them to control the cooling system 1.

The ECU 30 primarily has a CPU 310, a memory 320, and an input/output port 330. The input/output port 330 connects the ECU 30 with the various actuators and sensors via control signal lines. Here, the actuators include, for example, the fan 112, the water pumps WP1, WP2, the electric heater 202, the blower 220, and the valves V1, V3. The sensors include, for example, the temperature sensors 130, 132, 134, 230, 232 and the temperature setting control 401

The memory 320 records various programs for execution by the CPU 310. Using the programs recorded in the memory 320, the CPU 310 controls the operation of the cooling system 1.

A-2: System Control Modes:

The cooling system 1 has a first control mode and a second control mode which represent different modes of control of operation of the cooling system 1.

The first control mode is a normal operating mode in which no restrictions are placed on a first flow rate (L1) representing the flow rate of coolant flowing through the cooling circuit 10, or on a second flow rate (L2) representing the flow rate of coolant flowing through the air conditioning circuit 20. Specifically, in the first control mode, the first flow rate (L1) and the second flow rate (L2) can be controlled within the full range of capacity of the pumps WP1, WP2, according to conditions in the cooling system 1. For example, when the amount of the heat generation of the fuel cell stack 100 is low, the first flow rate (L1) can be decreased by decreasing the speed of rotation of the pump WP1. Or, for example, when the target vehicle interior temperature has increased, the second flow rate (L2) can be increased by increasing the speed of rotation of the pump WP2.

The second control mode is a flow rate control mode in which the ratio (L1/L2) of the first flow rate (L1) to the second flow rate (L2) is held at or above a prescribed value irrespective of conditions in the cooling system 1. Here, it is preferable to establish the prescribed value such that the temperature of the coolant resulting from convergence of the coolant flowing in the air conditioning circuit 20 with the coolant flowing in the cooling circuit 10 in the connected state (herein also be termed the "convergent coolant") is equal to or greater than a first threshold value. An example of a method for setting a prescribed value of the ratio (L1/L2) is described below making reference to FIG. 3. Further specifics of the first and second control modes will be discussed later.

Figure 3:
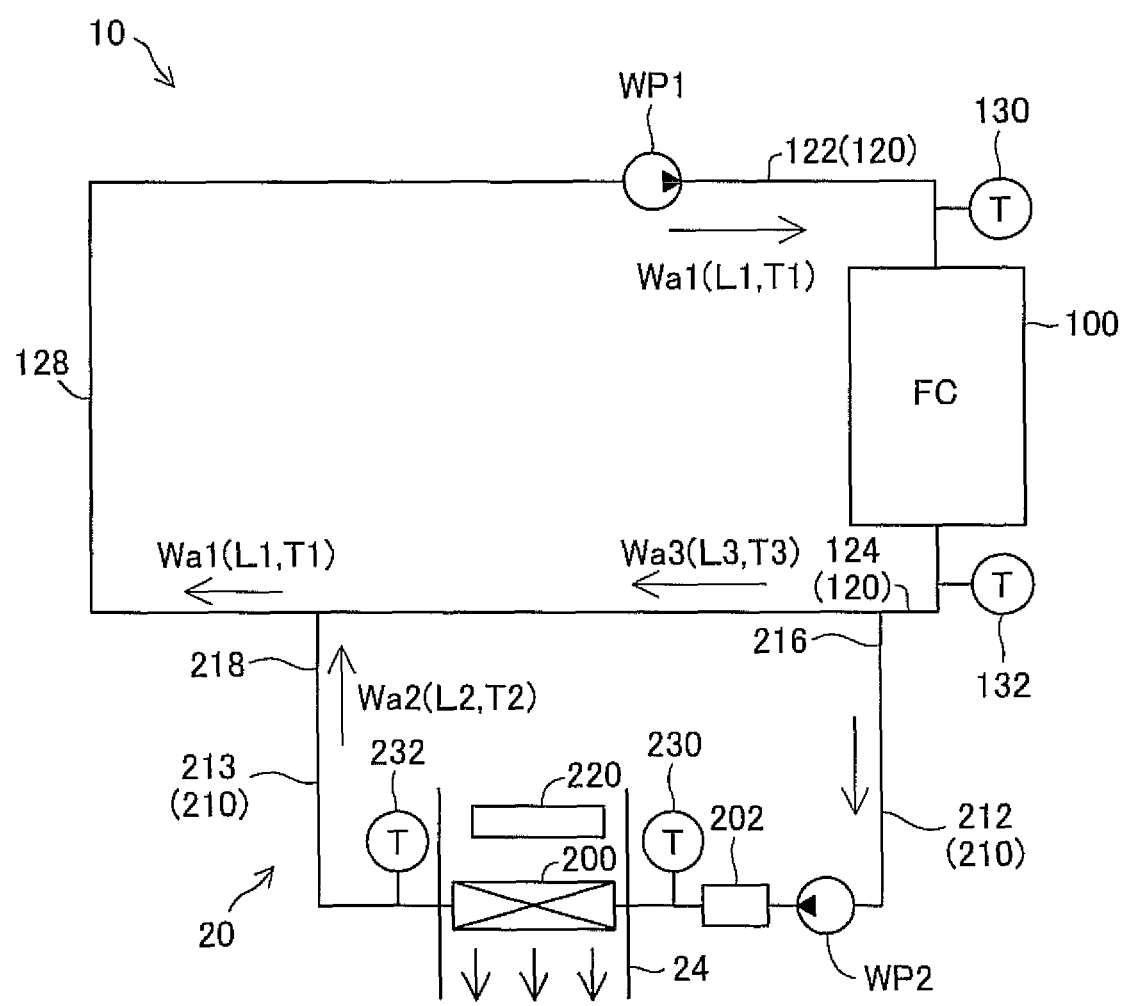
FIG. 3 shows flows of coolant in the connected state.

FIG. 3 shows flows of coolant in the connected state. In FIG. 3, neither the valves V1, V3 nor flow channels lacking coolant flows are depicted. The directions shown by arrows in FIG. 3 indicate the direction of coolant flow, while the symbols Wa1, Wa2, Wa3 appended to the arrows are used to distinguish the different coolant flows through the different flow channels. The symbols L1, L2, L3 appearing in parentheses next to the symbols indicate the flow rate of each coolant flow. The symbols T1, T2, T3 appearing in parentheses next to the symbols indicate the temperature of each coolant. Here, when heat is radiated by the heater core 200 to heat the vehicle interior 40, the coolant Wa2, which is at lower temperature subsequent to heat exchange, converges with the coolant Wa3 in the cooling circuit 10. Thus, the temperature of the convergent coolant Wa1 drops, so it is not necessary to execute cooling using the radiator 110. Therefore, opening/closing of the valve V1 is controlled to place the cooling circuit 10 in the second communicating state (FIG. 2A).

The flow rate (L1) can be computed from the speed of rotation of the pump WP1, while the flow rate (L2) can be computed from the speed of rotation of the pump WP2. The temperature T1 of the coolant Wa1 inflowing to the fuel cell stack 100 is assumed to be the temperature detected by the temperature sensor 130; and the temperature T2 of the coolant Wa2 that has passed through the heater core 200 of the air conditioning circuit 20 is assumed to be the temperature detected by the temperature sensor 232. As shown in FIG. 3, because the coolant Wa1 inflowing to the fuel cell stack 100 is also the convergent coolant Wa1, the temperature of the convergent coolant Wa1 can be detected by the temperature sensor 130. It would also be possible to provide an additional temperature sensor to detect the temperature of the convergent coolant flow, for example, at the point of convergence of the second communicating flow channel 218 and the outlet-end flow channel 124, or a point downstream from this convergence point.

Here, when the coolant Wa2 flowing in the air conditioning circuit 20 has converged with the coolant Wa3 flowing in the cooling circuit 10 to form the convergent coolant Wa1 flowing through the cooling circuit 10, the temperature T1 of the convergent coolant Wa1 can be computed using Expression (1) below.

$$T1=(T3 \times L3 + T2 \times L2)/(L3+L2) \quad (1)$$

The relationship indicated by Expression (2) below is true for the flow rate.

$$L1=L2+L3 \quad (2)$$

Based on the Expressions (1) and (2) above, there can be specified a ratio (L1/L2) such that temperature T1 equals or exceeds a first threshold value. Specifically, when the first threshold value is designed Tx, the ratio (L1/L2) can be specified using Expression (3) derived from Expressions (1) and (2) above.

$$L1/L2 \geq (T3-T2)/(T3-Tx) \quad (3)$$

For example, the temperatures detected by the temperature sensors 232, 132 just prior to switching from the disconnected state to the connected state may be substituted for temperature T2 and temperature T3 in Expression (3). Also, for example, the first threshold value Tx can be set to the minimum temperature for inlet water temperature at which good generating efficiency of the fuel cell stack 100 can be maintained. For example, the first threshold value Tx could be set to within a range between 50° C. and 75° C. The method described above for determining a prescribed value of the ratio (L1/L2) is but one example, and a prescribed value of the ratio (L1/L2) may be specified beforehand on the basis of expected temperatures T2, T3 associated with operation of the cooling system 1 in the disconnected state, and the threshold value Tx. In preferred practice the second control mode is executed with the ratio (L1/L2) at 2 or above for example. The drop in temperature of the convergent coolant can be limited thereby.

Figure 4A:
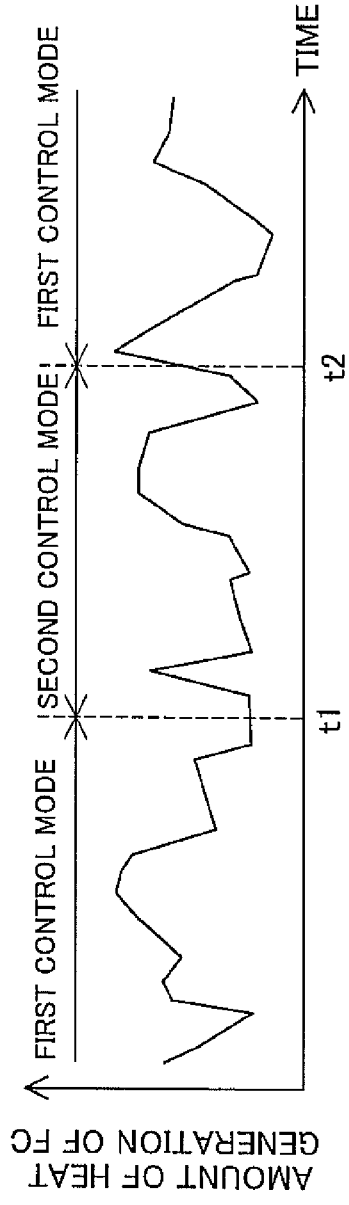
FIGS. 4A, 4B, and 4C illustrate a first control mode and a second control mode.
Figure 4B:
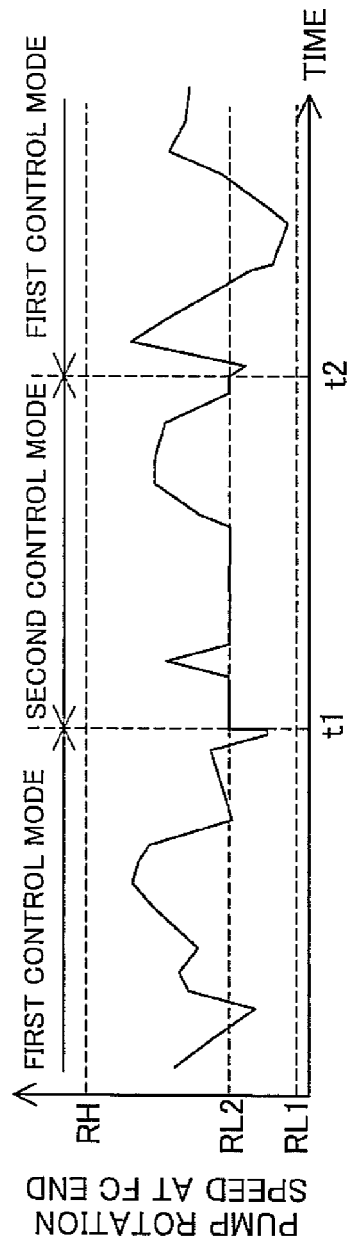
Figure 4C:
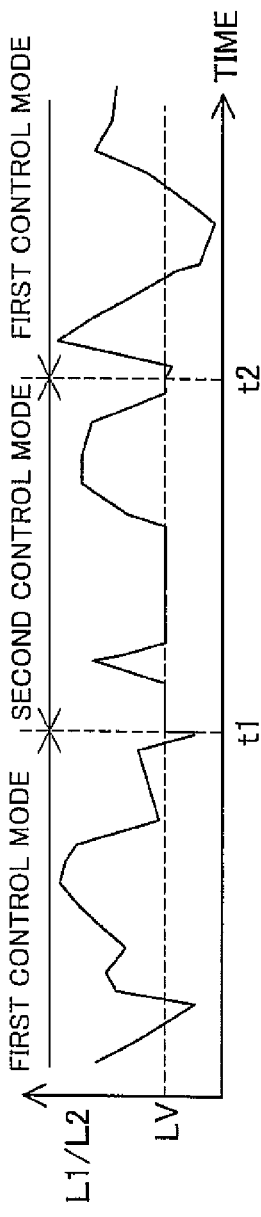

FIGS. 4A, 4B, and 4C illustrate the first control mode and the second control mode. FIG. 4A shows change over time in the amount of the heat generation of the fuel cell stack 100. FIG. 4B shows change over time in the speed of rotation of the pump WP1. FIG. 4C shows change over time in the ratio (L1/L2). FIGS. 4A, 4B and 4C have been created for the purpose of illustrating the control modes, and as such do not represent actual operating conditions.

As shown in FIGS. 4A, 4B and 4C, in the first control mode, the upper limit for the speed of rotation of the pump WP1 is set to a speed of rotation RH representing the maximum speed of rotation of which the pump WP1 is capable, while the lower limit is set to the minimum speed of rotation RL1 at which coolant is able to be delivered and circulated through the fuel cell stack 100. The upper limit for the speed of rotation of the pump WP2 is set to the maximum speed of rotation of which the pump WP2 is capable, while the lower limit of the speed of rotation is set to zero. That is, in the first control mode, no limitations are placed on the ratio (L1/L2) according to conditions in the cooling system 1 (conditions of the heat generation of the fuel cell stack 100, conditions of heating demand on the air conditioning end), so the speed of rotation of the pumps WP1, WP2 can vary within the full range of their capacity.

In the second control mode on the other hand, the lower limit for the pump WP1 is set to a speed of rotation RL2 that is greater than the speed of rotation RL1 of the first control mode. Thus, the ratio (L1/L2) is equal to or greater than a prescribed value LV. For example, as depicted in FIG. 4B, at time t1 at which operation of the cooling system 1 has switched from the first control mode to the second control mode, irrespective of the amount of the heat generation of the fuel cell stack 100, the speed of rotation of the pump WP1 rises to RL2 from a value smaller than RL2. In this way, during time t1 to t2 in which operation of the cooling system 1 is executed in the second control mode, the lower limit of the speed of rotation of the pump WP1 is boosted to above that in the first control mode, and the speed of rotation of the pump WP1 varies within the range between RL2 and RH. In the second control mode, as in the first control mode, the upper limit for the speed of rotation of the pump WP2 is set to the maximum speed of rotation of the pump WP2, while the lower limit of the speed of rotation of the pump WP2 is set to zero.

Figure 5:
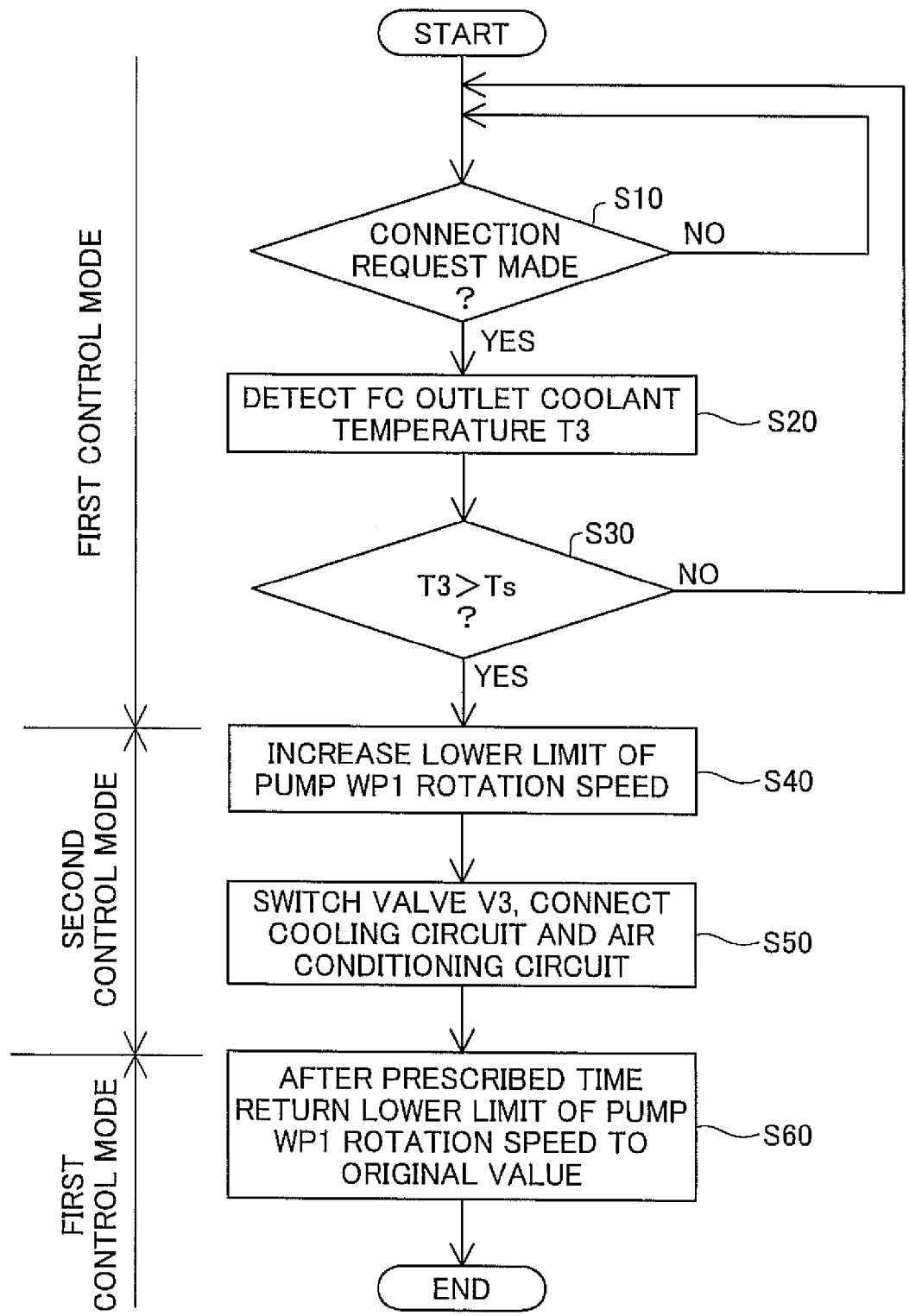
FIG. 5 is a flowchart showing operation control of the cooling system 1 of the first embodiment.

A-3. Control Flow and Effects:

FIG. 5 is a flowchart showing operation control of the cooling system 1 of the first embodiment. The ECU 30 decides whether there has been a request to switch from the disconnected state to the connected state (hereinafter also referred to as a "connection request") (Step S10). In the present embodiment, the ECU 30 decides whether the Heat switch has been turned ON by the user. When it is decided that there has been no connection request, Step S10 is executed repeatedly.

When it is decided that there has been a connection request, the ECU 30 detects the outlet water temperature T3 of the fuel cell stack 100 (Step S20), i.e. the detected value of the temperature sensor 130. Next, the ECU 30 decides whether the outlet water temperature T3 is greater than a switching threshold temperature Ts (Step S30). The switching threshold temperature Ts represents for example the minimum temperature at which coolant outflowing from the fuel cell stack 100 is utilizable as a heat source for the heater core 200. For example, the switching threshold temperature Ts may be set within a range between 50° C. and 60° C.

When the outlet water temperature T3 is equal to or less than the switching threshold temperature Ts (Step S30: NO), in the disconnected state with the cooling circuit 10 and the air conditioning circuit 20 not connected, the ECU 30 controls the pump WP2, the electric heater 202, and the blower 220 according to the demand for heating.

When the outlet water temperature T3 is greater than the switching threshold temperature Ts (Step S30: YES), the ECU 30 performs a setting to increase the lower limit of the speed of rotation of the pump WP1 (Step S40). Specifically, the ECU 30 switches the cooling system 1 from the first control mode to the second control mode and executes operations. In Step S40, when the communication state of the cooling circuit 10 is the first communication state, it is switched to the second communication state (FIGS. 2A and 2B).

Subsequent to Step S40, the ECU 30 switches the valve V3 and connects the cooling circuit 10 with the air conditioning circuit 20 to switch from the disconnected state to the connected state (Step S50). The coolant outflowing from the fuel cell stack 100 can thereby by utilized as a heat source for heat exchange by the heater core 200, and drop in temperature of the convergent coolant can be avoided. The order of Step S40 and Step S50 is not critical, and Step S40 and Step S50 may be executed simultaneously, or Step S40 may be executed after Step S50.

Subsequent to switching to the connected state in Step S50, once a prescribed period of time has elapsed, the lower limit for the speed of rotation of the pump WP1 is returned to its original value to switch operation from the second control mode to the first control mode (Step S60). In Step S60, the prescribed period of time can be set to the time period needed for any temperature drop of the convergent coolant to abate. For example, the prescribed period of time could be set to a time period such that the rate of temperature change of the convergent coolant after having switched to the connected state reaches 3° C. or less per five-minute interval. By switching operation from the second mode to the first mode after a prescribed time period has elapsed, power consumption by the pump WP1 can be reduced as compared to the case of continuous operation in the second control mode.

Figure 6A:
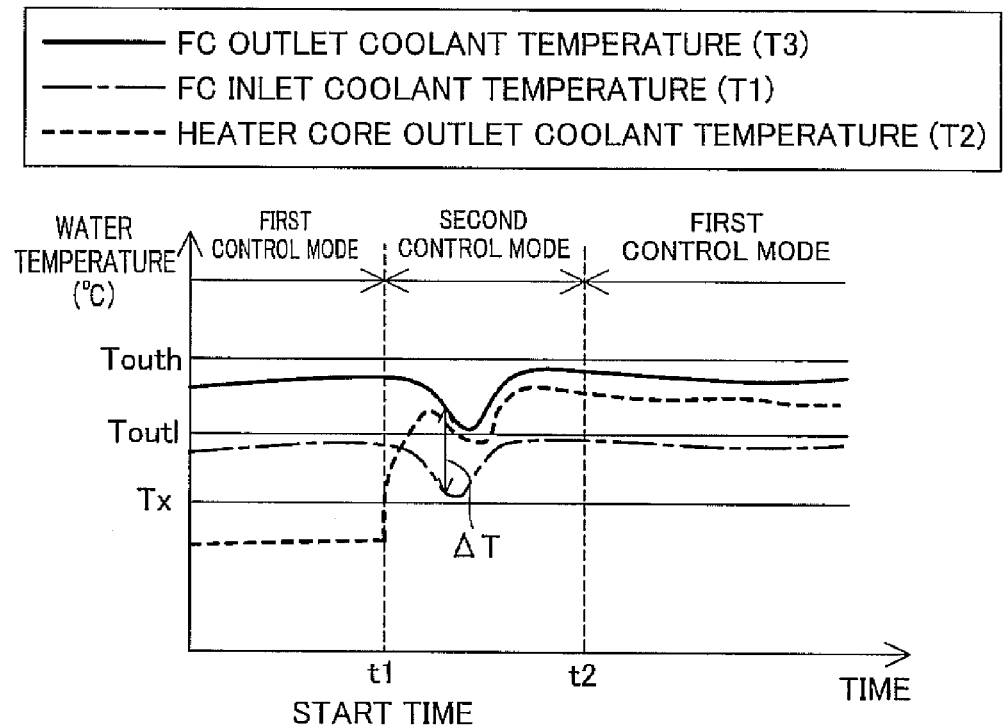
FIGS. 6A and 6B illustrate the effect of the first embodiment of the present invention.
Figure 6B:
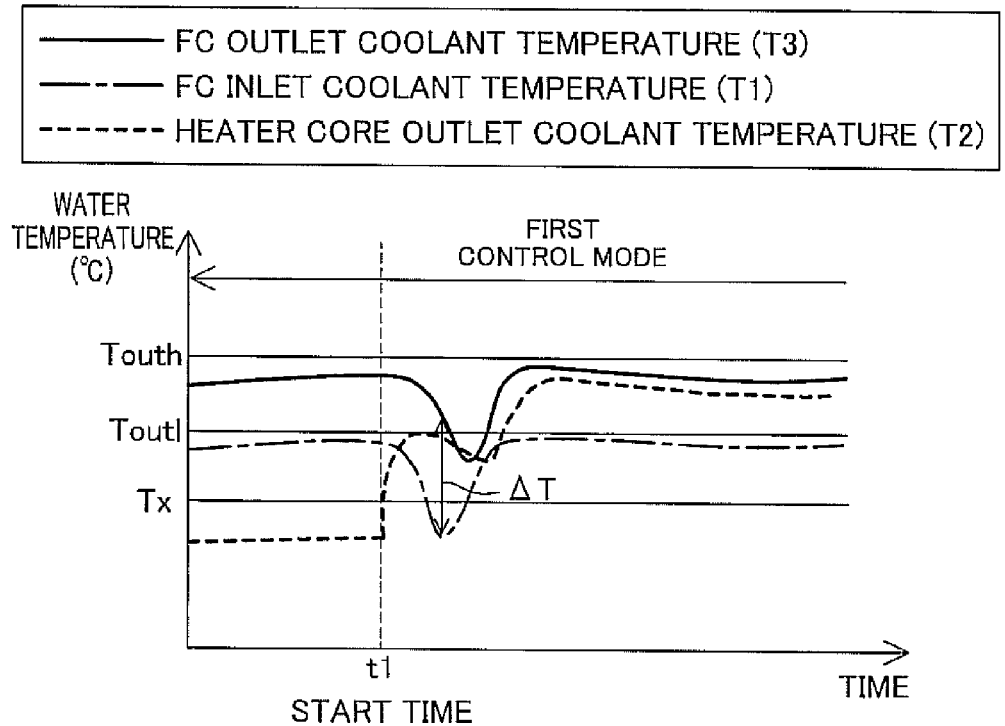

FIGS. 6A and 6B illustrate the effect of the first embodiment of the present invention. FIG. 6A depicts changes in temperatures over time during operation taking place when the cooling system of the first embodiment of the present invention is implemented (herein also termed "Embodiment operation"). FIG. 6B depicts changes in temperatures over time under circumstances in which operation is executed in the first control mode irrespective of whether the system is in the connected state or the disconnected state (herein also termed "Comparison operation"). FIGS. 6A and 6B show changes in temperatures observed after a prescribed time interval since initiating operation, not at the time of startup of the fuel cell stack 100. The symbols "Touth" and "Toutl" in the drawings denote the upper limit temperature and lower limit temperature of outlet coolant temperature at which good generating efficiency of the fuel cell stack 100 can be maintained. The symbol "Tx" in the drawing is the first threshold value, and represents the lower limit temperature of inlet coolant temperature at which good generating efficiency of the fuel cell stack 100 can be maintained. In the case of the present embodiment, Touth is set to 95° C., Toutl to 80° C., and Tx to 70° C.

As shown in FIG. 6A, during Embodiment operation, even with the cooling system 1 having been placed in the connected state, the inlet coolant temperature T1 of the fuel cell stack 100, which represents the temperature of the convergent coolant, was successfully maintained at or above the lower limit temperature Tx, i.e. the first threshold value. As compared with the Comparison operation shown in FIG. 6B, a sudden drop in temperature of the inlet coolant temperature T1 was avoided. The outlet coolant temperature T3 of the fuel cell stack 100 likewise varied within the range between the lower limit temperature Toutl and the upper limit temperature Touth. At time t2 occurring after elapse of prescribed time interval since initiation of the connection, the ECU 30 switched operation from the second control mode to the first control mode.

On the other hand, during Comparison operation as depicted in FIG. 6B, after connection the inlet coolant temperature T1 dropped sharply to below the lower limit temperature Tx. Likewise, the outlet coolant temperature T3 of the fuel cell stack 100 fell to below the lower limit temperature Toutl.

With regard to the temperature differential $\Delta T$ of the outlet coolant temperature T3 and the inlet coolant temperature T1, during the Embodiment operation this value was held to 10° C. or less, whereas during Comparison operation it exceeded 10° C. in some instances. By holding the temperature differential $\Delta T$ to no more than a prescribed value (e.g. 10° C.), it is possible to minimize variations in the internal temperature distribution of the fuel cell stack 100 and to further limit declines in generating efficiency.

Thus, in the present embodiment, when switching from the disconnected state to the connected state, operation takes place in the second control mode in which the ratio (L1/L2) is equal to or greater than a prescribed value, whereby decline in temperature of the convergent coolant can be limited, even when the waste heat of the fuel cell stack 100 is used as a heat source on the air conditioning end. Decline in the internal temperature of the fuel cell stack 100 can be limited thereby so as to limit any decline in generating efficiency. Also, by avoiding sharp drop in temperature of the convergent coolant it is possible to minimize variations in the internal temperature distribution of the fuel cell stack 100 and further limit declines in generating efficiency.

B. Second Embodiment

Figure 7A:
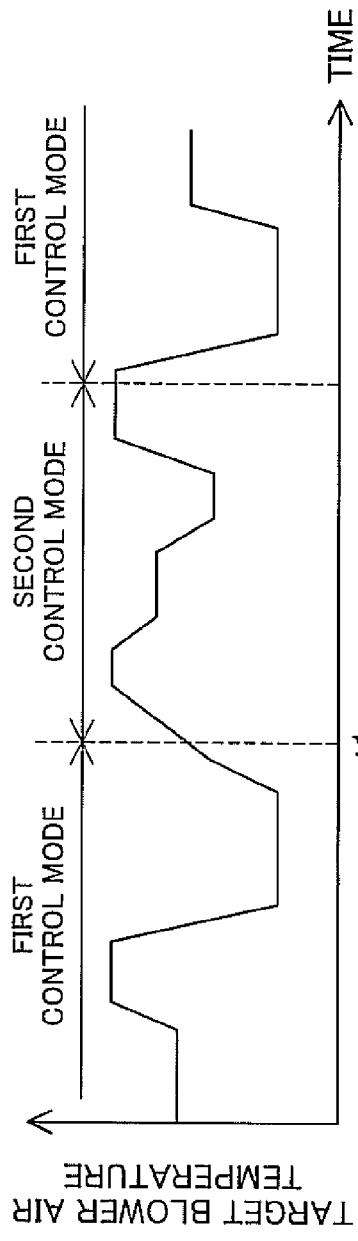
FIGS. 7A, 7B, and 7C illustrate a second control mode in a second embodiment of the present invention.
Figure 7B:
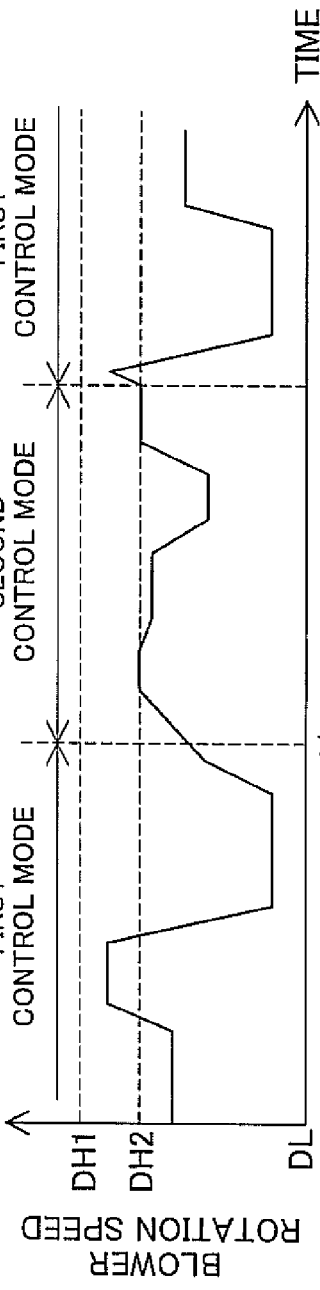
Figure 7C:
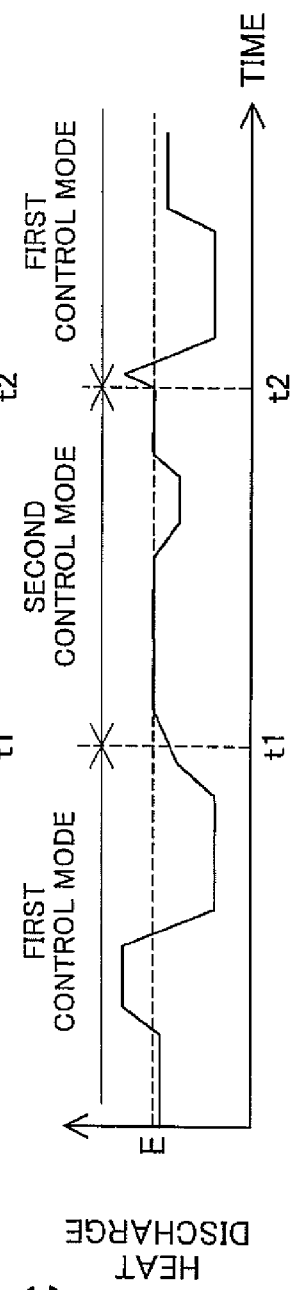

FIGS. 7A, 7B and 7C illustrate the second control mode of the second embodiment of the present invention. FIG. 7A depicts change over time of target blower air temperature. FIG. 7B depicts change over time of the speed of rotation of the blower 220. FIG. 7C depicts change over time of the heat discharge of the heater core 200. Here, the target blower air temperature is calculated using known methods on the basis of target vehicle interior temperature which is set by a demand for heating by the user, current vehicle interior temperature, current temperature outside the vehicle, and so on. FIGS. 7A, 7B and 7C have been created for the purpose of illustrating the control modes, and as such do not represent actual operating conditions. The difference from the first embodiment is the control method of the second control mode; the first control mode and the configuration of the cooling system 1 (FIG. 1) are comparable to those in the first embodiment and need not be discussed.

In the first control mode of the second embodiment, operation of the blower 220 is controlled within the full range of capacity (maximum speed of rotation DH1 and minimum speed of rotation DL (DL=0)) of the blower 220 according to the target blower air temperature. That is, in the first mode, the heat discharge is controlled by varying the speed of rotation of the blower 220 according to the demand for heating. This control mode is comparable to the first control mode in the first embodiment in that no restriction is placed on the ratio (L1/L2).

On the other hand, in the second control mode of the second embodiment (also termed "heat discharge control mode"), the speed of rotation of the blower 220 at the upper limit is set to DH2, which is a value smaller than the speed of revolution DH1 at the upper limit in the first control mode. That is, the upper limit of the volume of air blown to the heater core 200 is set to equal or less than a prescribed value that is smaller in comparison with the first mode. Thereby the heat discharge is set to a prescribed value E or lower, for example. As depicted in FIG. 7B for example, during time t1 to t2 when operation takes place in the second mode, the upper limit of the speed of rotation of the blower is brought down to a speed of rotation of DH2 from DH1, irrespective of the target blower air temperature; and the speed of rotation of the blower 200 varies within the range between a speed of rotation DL and DH2.

Figure 8:
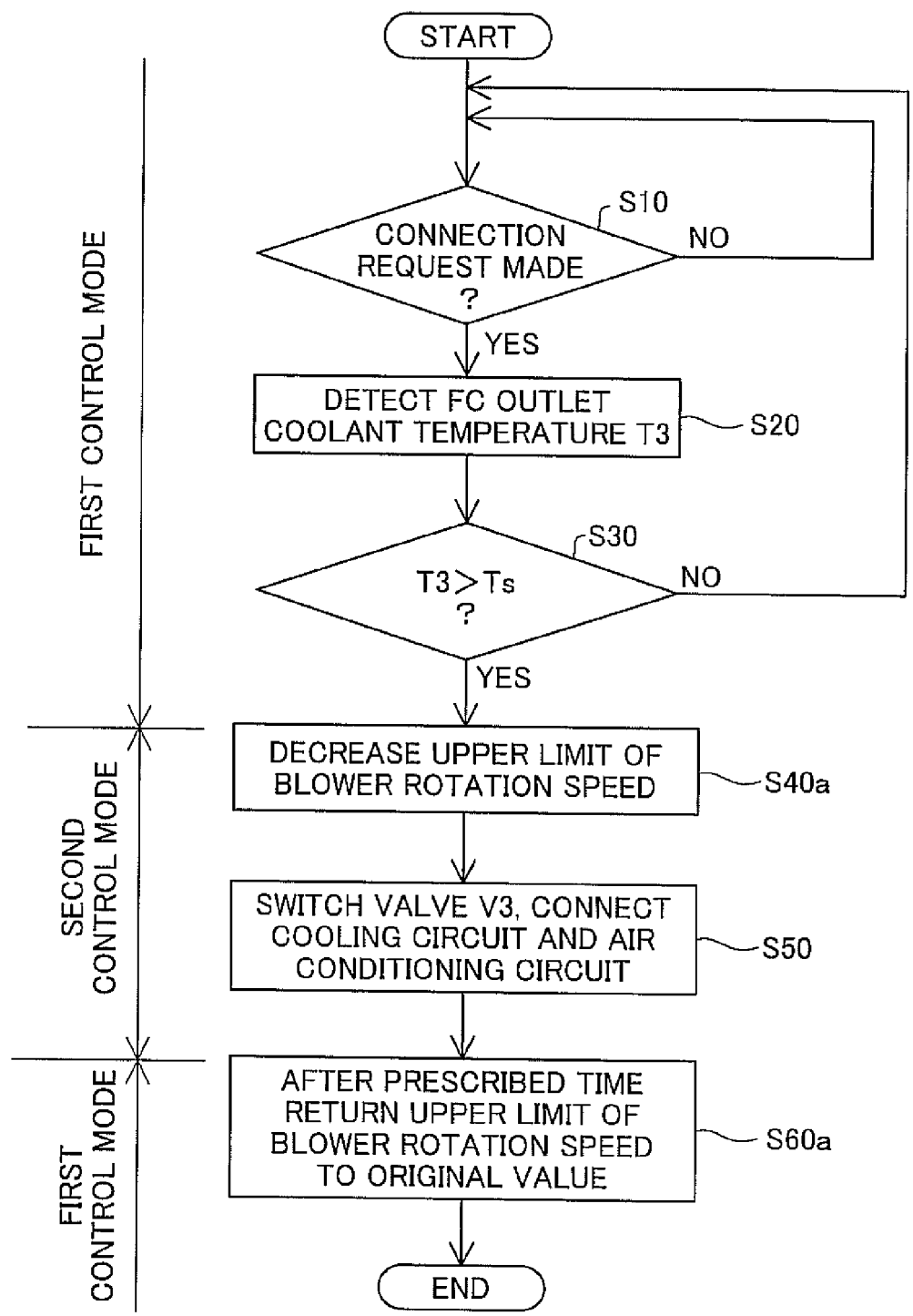
FIG. 8 is a flowchart showing operation control of the cooling system of the second embodiment.

FIG. 8 is a flowchart showing operation control of the cooling system of the second embodiment. The difference from the flowchart of the first embodiment (FIG. 5) is the control method of the second control mode. In other respects the flow is comparable to the control flow of the first embodiment, and steps which are identical have been assigned like symbols and are not discussed further.

When the ECU 30 has decided in Step S30 that the condition T3>Ts has been met, the ECU 30 performs a setting to decrease the upper limit of the speed of rotation of the blower 220 (Step S40*a*). Specifically, the ECU 30 switches the cooling system from the first control mode to the second control mode. By so doing, even when the system is switched from the disconnected state to the connected state in Step S50, decline in temperature of the convergent coolant can be limited. As in the first embodiment, when the communication state of the cooling circuit 10 is the first communication state, it is switched to the second communication state (FIG. 2). The order of Step S40*a* and Step S50 is not critical, and Step S40*a* and Step S50 may be executed simultaneously, or Step S40*a* may be executed after Step S50.

After switching to the connected state in Step S50, once a prescribed period of time has elapsed, the upper limit for the speed of rotation of the blower 220 is returned to its original value to switch operation from the second control mode to the first control mode (Step S60*a*). By so doing, operation can be executed according to the demand for heating, as compared to the case of continuous operation in the second control mode.

C. Modified Embodiments

Of the constituent elements set forth in the embodiments hereinabove, elements other than those expressly claimed in independent claims are supplemental elements and may be dispensed with as appropriate. The invention is not limited to the particular embodiments set forth herein, and while residing within the scope and spirit thereof may be reduced to practice in various other modes, such as the following modifications for example.

C-1. First Modified Embodiment

Figure 9:
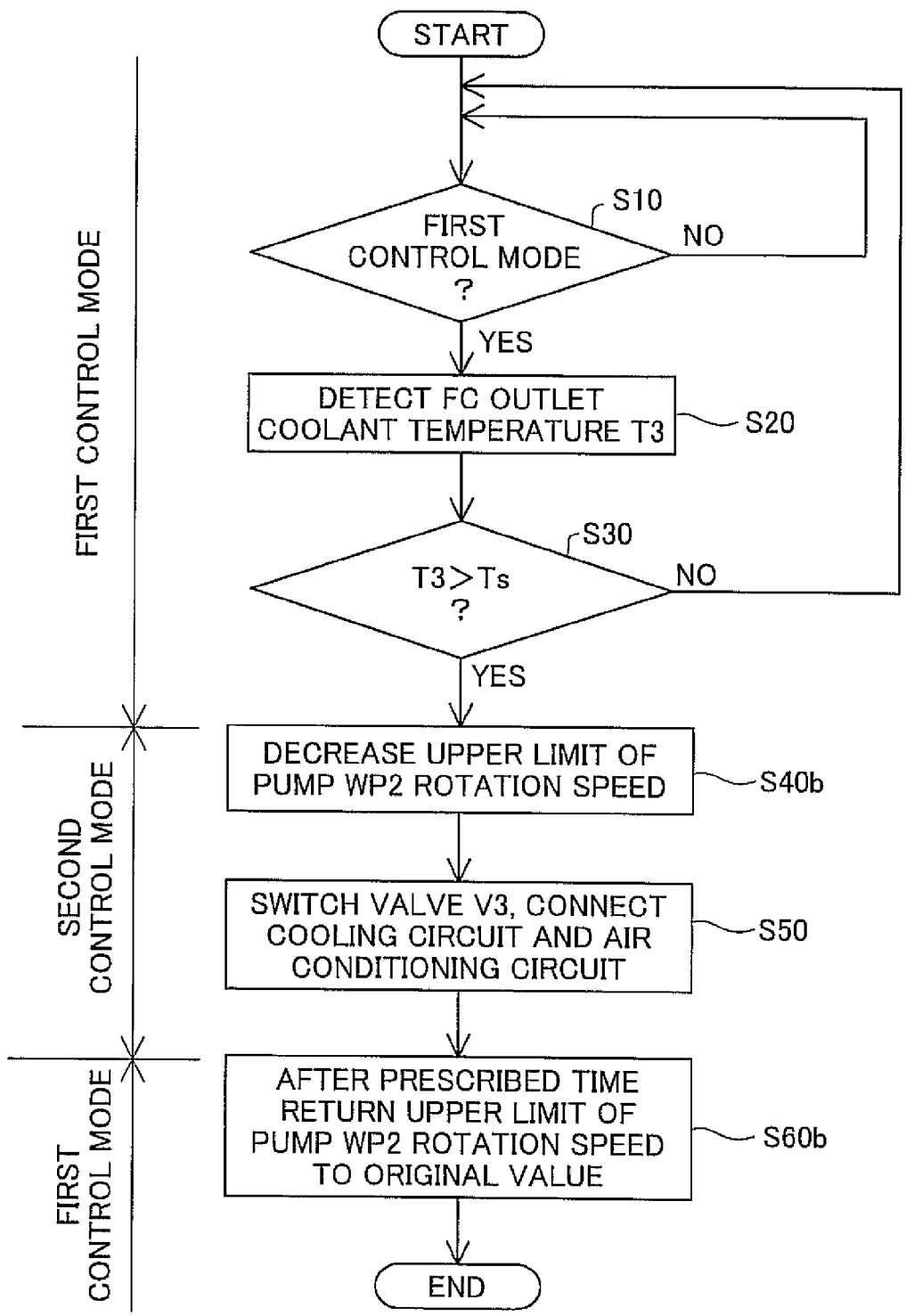
FIG. 9 is a flowchart showing operation control of the cooling system in a first modified embodiment.

FIG. 9 is a flowchart depicting operation control of the cooling system in the first embodiment. The difference from the control flow of the first embodiment (FIG. 5) is that Step S40 is replaced by Step S40*b*, and Step S60 is replaced by Step S60*b*. In other respects the flow is comparable to the control flow of the first embodiment, and steps which are identical have been assigned like symbols and are not discussed further. The configuration of the cooling system 1 of the first modified embodiment (FIG. 1) is comparable to that in the preceding embodiments and will not be discussed.

In the first embodiment, the ratio (L1/L2) was set to or above a prescribed value by raising the lower limit of the speed of rotation of the pump WP1 (FIG. 1) (FIG. 5: Step S40); in the first modified embodiment, however, the ratio (L1/L2) is set to or above a prescribed value by lowering the upper limit of the speed of rotation of the pump WP2 (FIG. 1). Specifically, when the ECU 30 has decided in Step S30 that the condition T3>Ts has been met, the controller switches a state of the cooling system from the first control mode to the second control mode by lowering the upper limit of the speed of rotation of the pump WP2 (Step S40*b*). Once a prescribed time period has elapsed after assuming the connected state, the upper limit of the speed of rotation of the pump WP2 is returned to its original value to switch operation from the second control mode to the first control mode (Step S60*b*). By so doing, decline in temperature of the convergent coolant can be limited in a manner comparable to the first embodiment. Thus, temperature decline inside the fuel cell stack 100 is limited so that decline in generating efficiency can be minimized.

C-2. Second Modified Embodiment

In the preceding Embodiments and Modified Embodiment, the second control mode is set up by controlling the ratio (L1/L2) to a value equal to or greater than a prescribed value Lv, or by bringing the heat discharge to a prescribed value E or less; however, the second control mode could instead be set up through a combination of these. Specifically, the second control mode may be executed by both bringing the ratio (L1/L2) to a value equal to or greater than a prescribed value Lv and bringing the heat discharge to a prescribed value E or less. By so doing, decline in temperature of the convergent coolant can be limited. In an alternative second control mode (flow rate control mode), the ratio (L1/L2) may be set to a value equal to or greater than a prescribed value Lv by both increasing the lower limit of speed of rotation of the pump WP1 to a value higher than in the first control mode, and reducing the upper limit of speed of rotation of the pump WP2 to a value lower than in the first control mode.

C-3. Third Modified Embodiment

In the preceding Embodiments, switching operation from the second control mode to the first control mode takes place subsequent to a prescribed time period elapsing since assuming the connected state, but this arrangement is not limiting, and operation in the second control mode may continue on until the system is again switched to the disconnected state. Decline in temperature of the convergent coolant can be limited in this manner as well. Also, control of the cooling system 1 is simpler.

C-4. Fourth Modified Embodiment

While the preceding Embodiments described examples in which the cooling system 1 is installed in a vehicle, the present invention may be adapted to moving bodies of various kinds. For example, the invention could be implemented in trains, ships, airplanes or various other moving bodies. Nor is the cooling system of the invention limited to moving bodies, and may be implemented in a system designed to utilize waste heat of a fuel cell stack 100 as a heat source for residential air conditioning.

C-5. Fifth Modified Embodiment

In the preceding Embodiments, the ECU 30 is used to control both the cooling circuit 10 having the fuel cell stack 100 and the air conditioning circuit 20 which is used to blow air into the vehicle interior 40; however, an ECU for controlling the cooling circuit 10 and an ECU for controlling the air conditioning circuit 20 could be provided separately. In this case, necessary information (temperature sensor 132 output values etc.) would be transmitted between the ECUs.

C-6. Sixth Modified Embodiment

In the preceding Embodiments, it was possible to utilize waste heat of the fuel cell stack 100, the electric heater 202, and the heater core 200 as heat sources for heating; however, the heat sources utilizable as heat sources for heating are not limited to these. For example, a heat pump, air heater, or similar heat exchanger could be provided in the ventilation duct 24.

C-7. Seventh Modified Embodiment

In the preceding Embodiments, a water coolant was employed as the cooling medium, but there is no particular limitation thereto, and other types fluids could be used as the cooling medium instead. For example, antifreeze comprising of water and an additive such as ethylene glycol, or a gas such as carbon dioxide, could be used as the cooling medium. These afford effects comparable to the preceding embodiments.

C-8. Eighth Modified Embodiment

In the preceding Embodiments, polymer electrolyte fuel cells were used for the fuel cell stack 100, but it would be possible to use various other types of fuel cell such as phosphoric acid fuel cells, molten carbonate fuel cells, or solid oxide fuel cells.

The invention is not limited to the particular embodiments set forth herein. Further some embodiments of possible modification are given below.

C-9. Other Modified Embodiments

According to a first aspect of the present invention, a cooling system is provided. The cooling system comprises:
a fuel cell;
a cooling circuit configured to circulate a coolant medium to cool the fuel cell;
an air conditioning circuit configured to circulate the coolant medium, the air conditioning circuit having a heat exchanger to execute heat exchange between the coolant medium and air to be sent to a room;
a switching unit configured to switch between a connected state and a disconnected state, wherein in the connected state the coolant medium flows from the cooling circuit to the air conditioning circuit, and then the coolant medium passed through the heat exchanger flows to the cooling circuit, and in the disconnected state a flow of a coolant medium between the cooling circuit and the air conditioning circuit is blocked; and
a controller configured to control operation of the cooling system,
wherein when the controller switches a state of the cooling system from the disconnected state to the connected state, irrespective of conditions in the cooling system, the controller executes operation of the cooling system in a flow rate control mode whereby the ratio (L1/L2) of a first flow rate (L1) to a second flow rate (L2) is set to or above a prescribed value, wherein the first flow rate (L1) represents the flow rate of the coolant medium flowing through the cooling circuit, and the second flow rate (L2) represents the flow rate of the coolant medium flowing through the air conditioning circuit.

According to the cooling system of the first aspect, when switching from the disconnected state to the connected state, by operating the cooling system in flow rate control mode whereby the ratio (L1/L2) is set to or above a prescribed value irrespective of the conditions in the cooling system, it is possible to prevent the temperature of the convergent coolant from dropping due to the coolant flowing through the air conditioning circuit after having passed through the heat exchanger having converged with the coolant flowing through the cooling circuit.

The cooling system according to the first aspect, wherein the prescribed value is determined by a range such that the temperature of the coolant medium observed subsequent to convergence of the coolant medium flowing in the air conditioning circuit with the coolant medium flowing in the cooling circuit is set to or above a first threshold value.

In preferred practice, this first threshold value is set to the minimum temperature (e.g. 60° C.) at which good generating efficiency of the fuel cell (e.g. in the case of a polymer electrolyte fuel cell, generating efficiency of 30% or above) can be maintained. According to the cooling system of this configuration, it is possible to prevent temperature drop of the fuel cell due to the convergent coolant in the cooling circuit being supplied to the fuel cell.

The cooling system according to the first aspect, wherein the controller executes operation of the cooling system in the flow rate control mode by setting the first flow rate (L1) to or above a prescribed value irrespective of conditions of the fuel cell.

According to the cooling system of this configuration, by setting the first flow rate (L1) to a prescribed value or above, it is possible to prevent the temperature of the convergent coolant in the cooling circuit from dropping.

The cooling system according to the first aspect, wherein the controller executes operation of the cooling system in the flow rate control mode by setting the second flow rate (L2) to or below a prescribed value irrespective of the heating demand by the air conditioning end.

According to the cooling system of this configuration, by setting the first flow rate (L2) to a prescribed value or below, it is possible to prevent the temperature of the convergent coolant from dropping.

The cooling system according to the first aspect, wherein the controller executes operation of the cooling system in the flow rate control mode, and after the cooling system is set to the connected state, switches the flow rate control mode to a normal control mode which does not include restriction of the ratio (L1/L2) being set to a prescribed value or above, and executes operation of the cooling system in the normal control mode.

According to the cooling system of this configuration, operation can take place more appropriately according to conditions in the cooling system, as compared to the case of continuous operation of the system in flow rate control mode. For example, when flow rate control mode is executed by setting the first flow rate (L1) to or above the prescribed value, the energy consumption entailed by circulating coolant in the cooling circuit can be reduced as compared to the case of continuous operation of the cooling system in flow rate control mode. Also, when for example flow rate control mode is executed by setting the second flow rate (L2) to or below the prescribed value, it is possible to reduce the likelihood of not being able to ensure the heat discharge commensurate with the demand for heating, as compared to the case of continuous operation of the cooling system in flow rate control mode.

According to a second aspect of the present invention, a cooling system is provided. The cooling system comprises:
a fuel cell;
a cooling circuit configured to circulate a coolant medium to cool the fuel cell;
an air conditioning circuit configured to circulate the coolant medium, the air conditioning circuit having a heat exchanger to execute heat exchange between the coolant medium and air to be sent to a room;
a switching unit configured to switch between a connected state and a disconnected state, wherein in the connected state the coolant medium flows from the cooling circuit to the air conditioning circuit, and then the coolant medium having passed through the heat exchanger flows to a cooling circuit, and in the disconnected state a flow of a coolant medium between a cooling circuit and the air conditioning circuit is blocked; and a controller configured to control operation of the cooling system, wherein when the controller switches a state of the cooling system from the disconnected state to the connected state, irrespective of the heating demand by the air conditioning end, the controller executes operation of the cooling system in a heat discharge control mode whereby the upper limit value of heat discharge of the heat exchanger is set to or below a prescribed value.

According to the cooling system of the second aspect, when switching from the disconnected state to the connected state, by setting the control mode of the cooling system to operate in heat discharge control mode whereby the heat discharge of the heat exchanger is set to or below a prescribed value irrespective of the demand for heating, it is possible to prevent the temperature of the convergent coolant from dropping due to the coolant flowing through the air conditioning circuit after having passed through the heat exchanger having converged with the coolant flowing through the cooling circuit.

The cooling system according to the second aspect further comprising:

a blower to send air to the heat exchanger, wherein the controller executes operation of the cooling system in the heat discharge control mode whereby the upper limit value of the volume of air being sent to the heat exchanger by the blower is set to or below a prescribed value.

According to the cooling system of this configuration, by setting the upper limit value of the volume of air being sent to the heat exchanger, it is possible to prevent the temperature of the convergent in the cooling circuit from dropping.

The cooling system according to the second aspect, wherein the controller executes operation of the cooling system in the heat discharge control mode, and after the cooling system is set to the connected state, switches the heat discharge control mode to a normal control mode which does not include restriction of the upper limit value of heat discharge of the heat exchanger being set to or below a prescribed value, and executes operation of the cooling system in the normal control mode According to the cooling system of this configuration, operation can take place more appropriately according to conditions in the cooling system, as compared to the case of continuous operation of the system in heat discharge control mode. For example, it is possible to reduce the likelihood of not being able to ensure the heat discharge commensurate with the demand for heating, as compared to the case of continuous operation of the cooling system in heat discharge control mode.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A cooling system comprising:
   a fuel cell;
   a cooling circuit configured to circulate a coolant medium to cool the fuel cell;
   an air conditioning circuit configured to circulate the coolant medium, the air conditioning circuit having a heat exchanger to execute heat exchange between the coolant medium and air to be sent to a room;
   a switching unit configured to switch between a connected state and a disconnected state, wherein in the connected state the coolant medium flows from the cooling circuit to the air conditioning circuit, and then the coolant medium having passed through the heat exchanger flows to the cooling circuit, and in the disconnected state a flow of a coolant medium between the cooling circuit and the air conditioning circuit is blocked; and
   a controller programmed to control operation of the cooling system,
   wherein when the controller switches a state of the cooling system from the disconnected state to the connected state, irrespective of conditions in the cooling system, the controller executes operation of the cooling system in a flow rate control mode whereby a ratio ($L1/L2$) of a first flow rate ($L1$) to a second flow rate rate ($L2$) is set to or above a prescribed value, wherein the first flow rate ($L1$) represents the flow rate of the coolant medium flowing through the cooling circuit, and the second flow rate ($L2$) represents the flow rate of the coolant medium flowing through the air conditioning circuit.

2. The cooling system according to claim 1, wherein the prescribed value is determined by a range such that a temperature of the coolant medium observed subsequent to convergence of the coolant medium flowing in the air conditioning circuit with the coolant medium flowing in the cooling circuit is set to or above a first threshold value.

3. The cooling system according to claim 1, wherein the controller executes operation of the cooling system in the flow rate control mode by setting the first flow rate ($L1$) to or above a prescribed value irrespective of conditions of the fuel cell.

4. The cooling system according to claim 1, wherein the controller executes operation of the cooling system in the flow rate control mode by setting the second flow rate ($L2$) to or below a prescribed value irrespective of the heating demand by the air conditioning end.

5. The cooling system according to claim 1, wherein the controller executes operation of the cooling system in the flow rate control mode, and after the cooling system is set to the connected state, switches the flow rate control mode to a normal control mode which does not include restriction of the ratio ($L1/L2$) being set to a prescribed value or above, and executes operation of the cooling system in the normal control mode.

6. A cooling system comprising:
   a fuel cell;
   a cooling circuit configured to circulate a coolant medium to cool the fuel cell;
   an air conditioning circuit configured to circulate the coolant medium, the air conditioning circuit having a heat exchanger to execute heat exchange between the coolant medium and air to be sent to a room;
   a switching unit configured to switch between a connected state and a disconnected state, wherein in the connected state the coolant medium flows from the cooling circuit to the air conditioning circuit, and then the coolant medium having passed through the heat exchanger flows to the cooling circuit, and in the disconnected state a flow of the coolant medium between the cooling circuit and the air conditioning circuit is blocked; and a controller programmed to control operation of the cooling system, wherein when the controller switches a state of the cooling system from the disconnected state to the connected state, irrespective of the heating demand by an air conditioning end, the controller executes operation of the cooling system in a heat discharge control mode whereby the upper limit value of heat discharge of the heat exchanger is set to or below a prescribed value.

7. The cooling system according to claim 6 further comprising:

a blower to send air to the heat exchanger, wherein the controller executes operation of the cooling system in the heat discharge control mode whereby the upper limit value of the volume of air being sent to the heat exchanger by the blower is set to or below a prescribed value.

8. The cooling system according to claim 6, wherein the controller executes operation of the cooling system in the heat discharge control mode, and after the cooling system is set to the connected state, switches the heat discharge control mode to a normal control mode which does not include restriction of the upper limit value of heat discharge of the heat exchanger being set to or below a prescribed value, and executes operation of the cooling system in the normal control mode.

* * * * *

UNITED STATES PATENT AND TRADEMARK OFFICE
CERTIFICATE OF CORRECTION

| | | |
|---|---|---|
| PATENT NO. | : 8,637,201 B2 | Page 1 of 1 |
| APPLICATION NO. | : 12/986824 | |
| DATED | : January 28, 2014 | |
| INVENTOR(S) | : Keigo Suematsu et al. | |

It is certified that error appears in the above-identified patent and that said Letters Patent is hereby corrected as shown below:

In the Claims:

At column 16, claim number 1, line number 22, After flow, Delete second occurrence of "rate".

Signed and Sealed this
Fifth Day of May, 2015

Michelle K. Lee
*Director of the United States Patent and Trademark Office*